United States Patent [19]

Doerr

[11] Patent Number: 5,035,914

[45] Date of Patent: Jul. 30, 1991

[54] CREAMY ORANGE SNACK CEREAL

[76] Inventor: Richard A. Doerr, 2 Thornton Ct., South Plainfield, N.J. 07080

[21] Appl. No.: 503,914

[22] Filed: Apr. 4, 1990

[51] Int. Cl.$^5$ .......................... A23P 1/14; A23L 1/18
[52] U.S. Cl. ................................. 426/621; 426/625
[58] Field of Search ............... 426/559, 621, 808, 440, 426/449, 450, 94, 625, 273, 305, 304, 303, 292, 291, 290, 289, 293, 295, 302

[56] References Cited

U.S. PATENT DOCUMENTS

| | | | |
|---|---|---|---|
| 1,832,813 | 11/1931 | Luke | 426/621 |
| 3,318,705 | 5/1967 | Clausi | 426/621 |
| 3,472,663 | 10/1969 | Laskin | 426/302 |
| 3,544,332 | 12/1970 | Leebens | 426/94 |
| 3,554,763 | 1/1971 | Fast | 426/450 |
| 3,557,718 | 1/1971 | Chivers | 426/290 |
| 3,561,981 | 2/1971 | Roe | 426/291 |
| 3,600,193 | 8/1971 | Glabe | 426/808 |
| 3,650,769 | 3/1972 | Fritzberg | 426/808 |
| 3,652,294 | 8/1972 | Marotta | 426/559 |
| 3,830,941 | 8/1974 | Luft | 426/94 |
| 3,876,811 | 4/1975 | Bonner | 426/621 |
| 4,251,551 | 2/1981 | Van Hulle | 426/808 |
| 4,409,250 | 10/1983 | Van Hulle | 426/621 |
| 4,661,362 | 4/1987 | Triani | 426/289 |
| 4,755,390 | 7/1988 | Calandro | 426/293 |
| 4,853,235 | 8/1981 | Tomomatsu | 426/94 |
| 4,910,031 | 3/1990 | Budd | 426/808 |
| 4,940,593 | 7/1990 | Duffy | 426/94 |
| 4,952,414 | 8/1980 | Kaufman | 426/621 |

FOREIGN PATENT DOCUMENTS 0188398  7/1986  European Pat. Off. ............ 426/808

*Primary Examiner*—Carolyn Paden
*Attorney, Agent, or Firm*—Kenneth P. Glynn

[57] ABSTRACT

The present invention is directed to a food for snack or as use as a breakfast cereal which has a creamy orange flavor. The food product includes a popped cereal which is selected from oat, wheat, rye, soy, corn, rice and combinations of these and essentially includes a powdered dairy or dairy substitute product which simulates cream flavor in combination with powdered orange or artificial orange flavor. Preferred embodiments include sweeteners such as fructose, sugar, corn syrup, dextrose, artificial sweeteners and combinations of these. Further, the food may include preservatives as well as vitamin and mineral supplements. In one embodiment, flavor enhancers are included. In yet another embodiment, the puffed cereal is formed in a shape of a sphere.

10 Claims, No Drawings

CREAMY ORANGE SNACK CEREAL

BACKGROUND OF THE INVENTION

1. Field of the invention

The present invention is directed to a cereal product which may be used as a breakfast food or a snack food. More particularly, the present invention is directed to such a food which has a simulated creamy orange flavor.

2. Prior Art Statement

Breakfast cereals and porridges based on various grains have been around for many hundreds and perhaps thousands of years. Mass produced, prepackaged cereals are a creation of the industrial age and sugared cereals as well as fruit flavored cereals have been on the market for many years. Without referencing specific literature or trade name products, it is well known that fruit flavored cereals and chocolate and cocoa flavored cereals in the form of flakes, grains, puffs, etc. have had great success in the marketplace. Notwithstanding the plethora of products currently available, it is believed that the present invention product which takes the combined flavors of creamy ice cream and orange to create a product which may be eaten as a snack without milk or liquid and yet has the "creamsicle" flavor, it is neither suggested nor taught in the prior art.

SUMMARY OF THE INVENTION

The present invention is directed to a food for snack or as use as a breakfast cereal which has a creamy orange flavor. The food product includes a puffed cereal which is selected from oat, wheat, rye, soy, corn, rice and combinations of these and essentially includes a dairy substitute product or flavoring which simulates cream flavor in combination with powdered orange or artificial orange flavor. Preferred embodiments include sweeteners such as fructose, sugar, corn syrup, dextrose, artificial sweeteners and combinations of these. Further, the food may include preservatives as well as vitamin and mineral supplements. In one embodiment, flavor enhancers are included. In yet another embodiment, the puffed cereal is formed in a shape of a sphere.

DETAILED DESCRIPTION OF THE PRESENT INVENTION

The present invention cereal product is basically a grain product which is made from crushed cereal from oat, wheat, rye, soy, corn, and rice, as well as mixtures of these or any or all of these with other grains included. The creation of a puffed product may be accomplished by any known technique and the details are not described herein as the technique for making such products as puffed rice, cocoa puffs, Cheerios (a trademarked product of General Mills) and the like. In general, about 40% to about 95% by weight of a puffed cereal selected from the foregoing is used based on the total weight of the food. Preferably about 60% to about 80% by weight of the puffed cereal is used.

In addition to the cereal base utilized in the food product of the present invention, two essential ingredients are required. These are the constituent which creates the simulated cream flavor and the constituent which creates the orange flavor. As to the cream flavor or creamy ice cream flavor, this is obtained by using powdered non-dairy cream substitutes such as are currently on the market and used, for example, as a coffee creamer or a cream flavoring, such as vanillin. In general, about 2% to about 20% by weight, based on the total weight of the food product, should be included. More preferably, about 5% to about 10% by weight should be used. As to the orange flavor, either natural powdered orange or orange concentrate or artificial orange flavoring which is currently available, may be used. Generally, about 0.05% to about 15% by weight of the orange flavor is included and preferably about 0.1% to about 12% by weight, based on the total weight of the food product, is used. Note that artificial orange flavor would be used at the lower end of the range, e.g., 0.005 to 0.5% and that natural orange would be used in greater amounts, depending upon the desired strength of the orange flavor in this product.

In a preferred embodiment, the food of the present invention is also sweetened. Thus, up to about 60% and preferably no more than 40% by weight, based on the total weight of the food, of a sweetener may be included which is selected from fructose, sugar, corn syrup, dextrose, artificial sweeteners and combinations thereof. Since sweeteners are optional, the range of up to 60% is within the scope of the invention. Artificial sweeteners, as with artificial flavorings, would be used in low concentrations to achieve the desired results. Additionally, up to about 2% by weight of preservatives may be included. However, legal requirements may govern maximum levels of usage. These may be the conventional preservatives which are utilized in cereal products, such as BHT.

Also, vitamins and mineral supplements may be included up to about 2% by weight, based on the total weight of the food product. Such vitamins and minerals include zinc, iron, AB vitamin, Vitamin B2, B6, B12, Folic Acid, Vitamin D. etc.

Other additives and flavor enhancers such as citric acid may be included up to available legal limits, up to about 5% by weight, based on the total weight of the food product.

The present invention food product may preferably be formed in the shape of a sphere, although other shapes may be used without exceeding the scope of the invention. Additionally, it is preferred that the color orange be the predominant color of the product and this may be obtained by food colorant and/or the predominant color of the essential constituents (cream mixed with orange). Thus, in one preferred embodiment, the product appears to be like small orange balls or basketballs.

The present invention food product may be eaten with milk and topped with fruit, or raisins, or other condiments or additives which are used in conjunction with breakfast cereals. Alternatively or additionally, the food product of the present invention may be used as a dry snack and may be sold like potato chips or other dry snacks. Advantageously, when eaten dry, the moisture of the mouth combined with the cream and orange flavors will create a creamy ice cream-orange flavor which will be unusual and pleasing to the consumer. In those embodiments which include sweeteners, the creamy orange ice cream effect will be the predominant flavor.

Obviously, numerous modifications and variations of the present invention are possible in light of the above teachings. It is therefore understood that within the scope of the appended claims, the invention may be practiced otherwise than as specifically described herein.

What is claimed is:

1. A food product for snack or as a breakfast cereal which has a simulated non-dairy cream and orange flavor, which comprises:
   a) 40% to 95% weight of a puffed cereal base selected from oat, wheat, rye, soy, corn and rice, and combinations thereof, based on total wight of the food;
   b) 2% to 20% by weight, based on total weight, of a vanillin based dairy substitute product which simulates cream flavor; and,
   c) 0.05% to 15% by weight, based on total weight, of powdered orange or artificial orange flavor.

2. The food product of claim 1, which further comprises: 0% to 60% by weight, based on total weight, or sweetener selected from fructose, sugar, corn syrup, dextrose, artificial sweeteners and combinations thereof.

3. The food product of claim 2, which comprises: 0% to 40% by weight, based on total weight, of said sweetener.

4. The food product of claim 3, which further comprises: 0% to 2% by weight, based on total weight, of preservatives.

5. The food product of claim 2, which further comprises: 0% to 5% by weight, based on total weight, of additives, colorants and flavor enhancers.

6. The food product of claim 1, which further comprises: 0% to 2% by weight, based on total weight, of preservatives; 0% to 2% by weight, based on total weight, of vitamin and mineral supplements.

7. The food product of claim 6, which further comprises: 0% to 5% by weight, based on total weight, of additives, colorants and flavor enhancers.

8. The food product of claim 1, which further comprises: 0% to 5% by weight, based on total weight, of additives, colorants and flavor enhancers.

9. A food for snack or as a breakfast cereal which as a simulated non-dairy cream and orange flavor, which comprises:
   a) 40% to 95% by weight of a puffed cereal base selected from oat, wheat, rye, soy, corn and rice, and combinations thereof, based on total weight of the food;
   b) 2% to 20% by weight, based on total weight, of a vanillin based dairy substitute product which simulates cream flavor;
   c) 0.05% to 15% by weight, based on total weight, of powdered orange or artificial orange flavor;
   d) Up to 40% by weight, based on total weight, of sweetener selected from fructose, sugar, corn syrup, dextrose, artificial sweeteners and combinations thereof;
   e) Up to 2% by weight, based on total weight, of preservatives;
   f) Up to 2% by weight, based on total weight, of vitamin and mineral supplements;
   g) Up to 5% by weight, based on total weight, of additives and flavor enhancers.

10. A food for snack or as a breakfast cereal which has a simulated non-dairy cream and orange flavor, which comprises:
   a) 60% to 80% by weight of a puffed cereal base selected from oat, wheat, rye, soy, corn and rice, and combinations thereof, based on total weight of the food;
   b) 5% to 10% by weight, based on total weight, of a vanillin based dairy substitute product which simulates cream flavor;
   c) 0.1% to 12% by weight, based on total weight, of powdered orange or artificial orange flavor;
   d) Up to 40% by weight, based on total weight, of sweetener selected from fructose, sugar, corn syrup, dextrose, artificial sweeteners and combinations thereof;
   e) Up to 2% by weight, based on total weight, of preservatives;
   f) Up to 2% by weight, based on total weight, of vitamin and mineral supplements;
   g) Up to 5% by weight, based on total weight, of additives and flavor enhancers.

* * * * *